United States Patent
Bartlett et al.

(10) Patent No.: US 8,462,830 B2
(45) Date of Patent: Jun. 11, 2013

(54) RADIO FREQUENCY DISTRIBUTION WITH SPREADING

(75) Inventors: Allan Bartlett, Newbury (GB); Alan Law, Basingstoke (GB)

(73) Assignee: Vodafone Group PLC, Newbury, Berkshire (GB)

(\*) Notice: Subject to any disclaimer, the term of this patent is extended or adjusted under 35 U.S.C. 154(b) by 846 days.

(21) Appl. No.: 12/309,451

(22) PCT Filed: Jul. 23, 2007

(86) PCT No.: PCT/GB2007/002813
§ 371 (c)(1),
(2), (4) Date: Mar. 13, 2009

(87) PCT Pub. No.: WO2008/009982
PCT Pub. Date: Jan. 24, 2008

(65) Prior Publication Data
US 2009/0323767 A1    Dec. 31, 2009

(30) Foreign Application Priority Data
Jul. 21, 2006 (GB) .................................. 0614542.9

(51) Int. Cl.
*H04B 3/36* (2006.01)
*H04L 27/00* (2006.01)

(52) U.S. Cl.
USPC ........... 375/146; 375/141; 375/211; 375/257; 375/259

(58) Field of Classification Search
USPC ................. 375/140, 141, 146, 147, 211, 257, 375/259
See application file for complete search history.

(56) References Cited

U.S. PATENT DOCUMENTS

| 5,765,099 | A | | 6/1998 | Georges et al. | |
|---|---|---|---|---|---|
| 5,983,070 | A | * | 11/1999 | Georges et al. | 725/78 |
| 6,014,546 | A | | 1/2000 | Georges et al. | |
| 6,876,852 | B1 | | 4/2005 | Li et al. | |
| 6,976,202 | B1 | * | 12/2005 | Rezvani et al. | 714/752 |
| 7,113,484 | B1 | * | 9/2006 | Chapman et al. | 370/252 |
| 7,839,900 | B1 | * | 11/2010 | Herder et al. | 370/545 |
| 2002/0052188 | A1 | | 5/2002 | Behbahani | |
| 2002/0102968 | A1 | * | 8/2002 | Arend et al. | 455/414 |
| 2003/0185163 | A1 | * | 10/2003 | Bertonis et al. | 370/315 |
| 2004/0057499 | A1 | * | 3/2004 | Haartsen | 375/136 |

FOREIGN PATENT DOCUMENTS

| GB | 2300549 A | 11/1996 |
|---|---|---|
| WO | WO85/05745 | 12/1985 |
| WO | WO94/13067 | 6/1994 |
| WO | WO/02/23713 A2 | 3/2002 |

OTHER PUBLICATIONS

U.S. Appl. No. 12/306,426, filed Mar. 10, 2009, Bartlett, et al.

\* cited by examiner

*Primary Examiner* — David B. Lugo
(74) *Attorney, Agent, or Firm* — Muirhead and Saturnelli, LLC

(57) ABSTRACT

A system for distributing a radio frequency (RF) signal using a data cable system includes a method and apparatus with components that receive the RF signal, determine the passband of the data cable system, spread the RF signal within the passband as a spread signal, insert the spread signal into the cable system, extract the spread signal from the data cable system as an extracted signal, convert the extracted signal to a transmission frequency as a converted signal, and transmit the converted signal.

15 Claims, 5 Drawing Sheets

RADIO FREQUENCY DISTRIBUTION WITH SPREADING

TECHNICAL FIELD

This application relates to a radio frequency (RF) distribution system and, in particular, to a system and method for distributing RF signals using existing cabling.

BACKGROUND OF THE INVENTION

Typically, mobile phone coverage is provided by transmitting the RF signals from basestations. Users' handsets communicate with the network by transmitting signals back to the basestation. A problem faced by mobile phone operators is that certain locations receive a poor quality of reception or, in some cases, no reception at all. These areas of poor reception are generally caused by the RF signals being blocked by natural or other obstacles. Examples of areas of poor reception are valleys or other areas in which the natural landscape prevents the penetration of the signals, built up areas in which buildings block the RF signals or within buildings where the general building layout prevent the mobile signals from reaching all parts of the building.

One solution to improving the coverage in areas of poor reception is repeaters. Repeaters are placed around areas of poor coverage but in locations where RF signals can be received. Repeaters operate by receiving RF signals from basestations, amplifying the signal and re-transmitting the signal into the area of poor coverage. They also receive signals from handsets in the vicinity of the repeater, amplify these and retransmit them to the basestation. Although repeaters improve the level of coverage in certain areas their successful operation is entirely reliant on their ability to receive the RF signal from the basestation. Another problem is that they retransmit the signal in vicinity in which it was received and so, although they boost the signal strength, in many cases they cannot fully penetrate areas of poor coverage. A further problem is that feedback between the receiver and the transmitter can cause operational problems and so careful setup of the repeaters is required. These factors increase the installation costs and reduce the application for repeaters to provide enhanced coverage in many areas.

In a second known solution, RF mobile phone signals are inserted directly into existing cables, for example television cables, within buildings or, on a wider scale, in underground distribution cabling. The RF signals are received from either repeaters in good coverage locations or dedicated basestations and are input into the cable and passed through the cable to transmitters positioned in areas of poor coverage. A problem faced by such systems is that existing cabling includes components, for example amplifiers, which only allow the passage of signals which are within particular frequency ranges. Generally, the frequency of RF mobile phone signals falls outside the frequency range of such amplifiers and so would be filtered by the amplifier which results in data loss. In order to avoid the loss of the RF signals in this situation, the RF signal must bypass the amplifier by being filtered out of the cable before it reaches the amplifier and then reinserted after the amplifier. In practice, in order to avoid RF signal loss, the cable must be accessed at the position of the amplifier and a bypass cable attached on either side of the amplifier which retrieves the RF signal and reinserts it after the amplifier. The bypassing of every amplifier or other potentially filtering component in a pre-installed cable makes installation of bypass components inconvenient and is impractical.

Accordingly, it would be beneficial to carry an RF signal into an area of poor coverage using pre-installed cabling. However, the requirement of physically inserting filters and bypass components around each amplifier or device which would filter the RF signal is impractical for large scale implementation.

SUMMARY OF THE INVENTION

Embodiments of the system described herein use existing cabling to carry RF signals into areas of poor coverage but avoid having to bypass the amplifiers. Embodiments of the system described herein spread the RF signal before it is input into the cable within the frequency range which is able to pass through the amplifiers. Such embodiments provide the advantage that the RF signals are distributed into the areas of poor coverage but do not require the cable to be accessed at any point other than the input and output points. Thus, installation costs are reduced and the system is compatible with any cable.

In various embodiments of the system described herein, the RF signal is spread over a large bandwidth in order that the magnitude of the RF signal is reduced. Such embodiments reduce the interference between the RF signal and the signal carried by the cable. In various embodiments the signal is spread over the full bandwidth which is able to pass through the amplifiers and other devices.

BRIEF DESCRIPTION OF THE DRAWINGS

Embodiments of the system described herein are now explained with reference to the accompanying figures, in which.

DETAILED DESCRIPTION OF VARIOUS EMBODIMENTS

Figure 1:
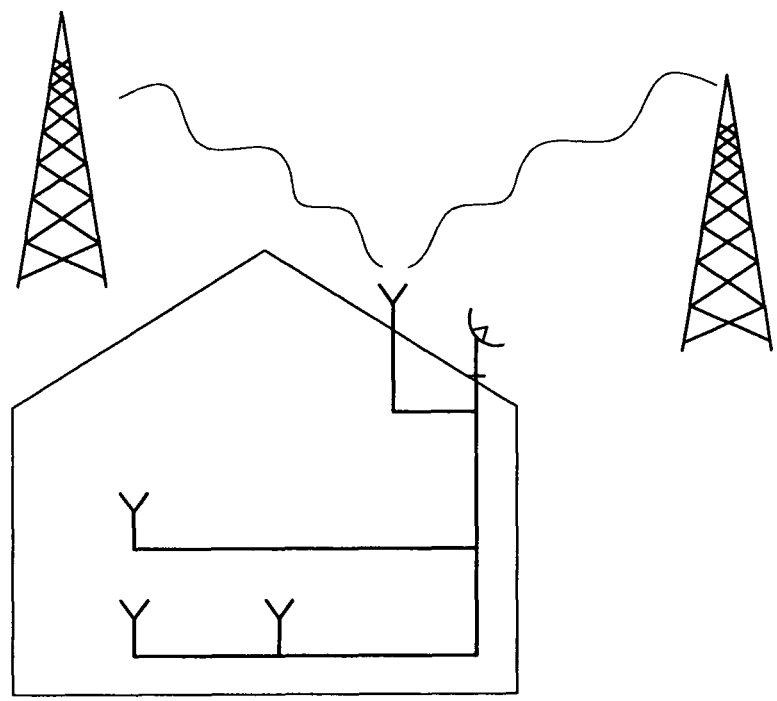
FIG. 1 shows a building having digital television cabling and having an antenna for receiving mobile telecommunication signals.

FIG. 1 shows a building which is located in an area of RF coverage. In the example of FIG. 1 RF coverage is mobile telecommunication coverage which is provided by network of base stations. The walls, windows, floors etc of the building cause attenuation of the RF signal and so areas within the building will experience poor or no RF coverage. The building of FIG. 1 includes a cabling infrastructure to carry digital television signals into the different rooms.

In the embodiment of FIG. 1, RF signals are received in an area of coverage, inserted into the digital TV cabling and distributed around the building to provide improved RF coverage throughout the building.

Figure 2:
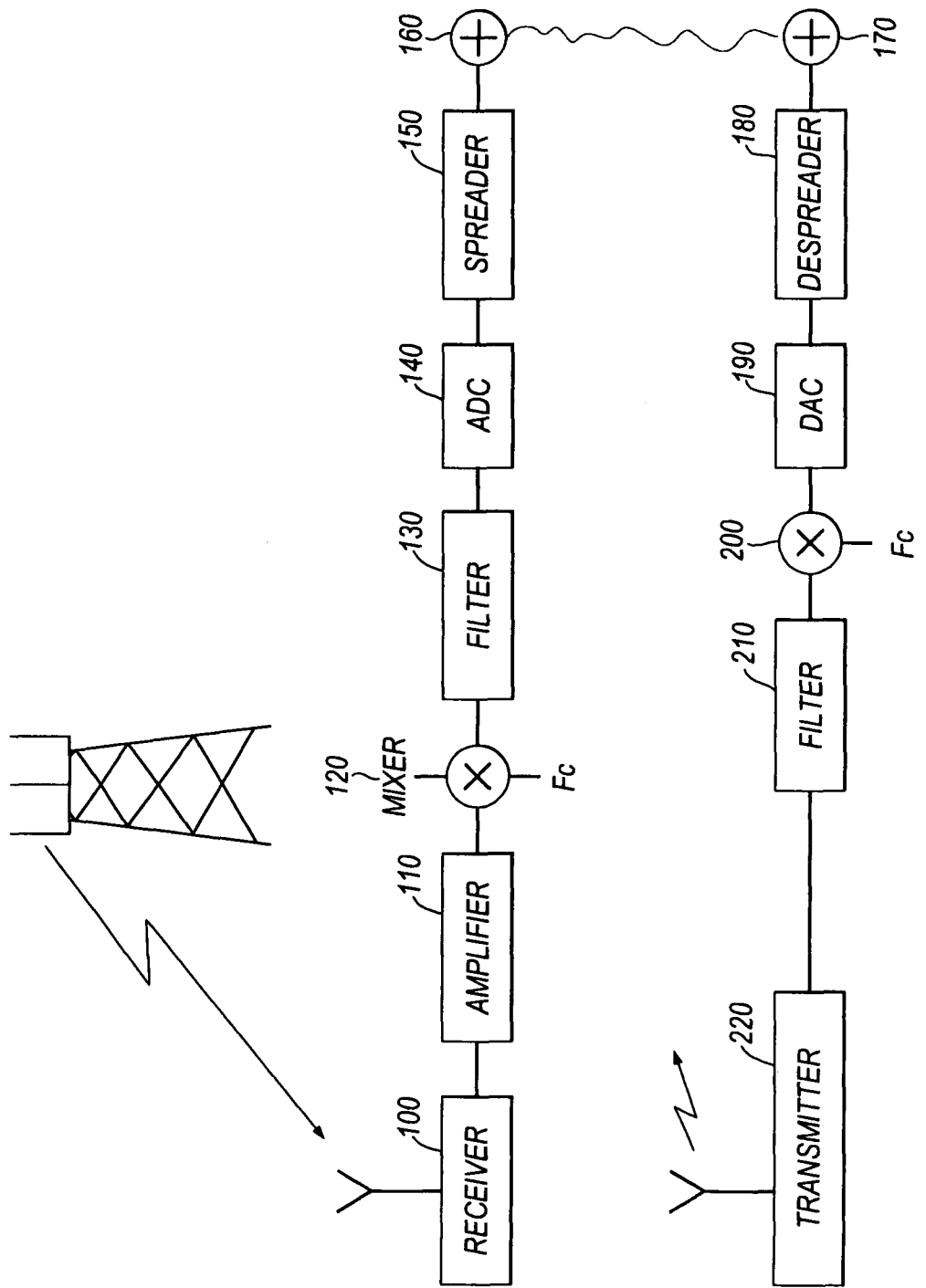
FIG. 2 is a block diagram showing the components of a first embodiment of the invention. For simplicity only the downlink (DL) path is shown, the uplink (UL) has the elements in reverse.

FIG. 2 shows the components and connections between of components in the building shown in FIG. 1 in which the digital television cabling within a building is used to distribute RF signals. RF signals are received by a receiver 100. The receiver should be positioned in an area of RF coverage, typically on the roof or outside wall of the building. In preferred embodiments of the invention the receiver is incorporated into existing aerials or satellite receivers. For example, the receiver 100 could be incorporated into a satellite dish which is used to receive digital television broadcast signals. In the example of FIG. 2 the RF receiver is tuned to receive over the air 2G mobile telecommunications signals, in the frequency range of around 900 MHz. However, in alternative embodiments, the RF receiver would be suitable for receiving, or tuned to, different RF frequencies which are desired to be received. In preferred embodiments of the invention the receiver is incorporated into an existing aerial or satellite receiver.

It is not essential that the receiver is incorporated into existing devices and, instead, the receiver could be an entirely separate device.

In alternative embodiments a dedicated basestation could be used to supply the RF signal. Additionally, the RF signal need not be received by an over the air receiver but, instead, could be provided by a wired connection directly from the network.

After reception, the RF signal may be filtered and amplified using a standard filter and amplification system 110. The analogue RF signal is then mixed with the RF carrier frequency using a mixer 120 in order to mix the signal up to the carrier frequency. The signal is then filtered to provide the baseband signal 130. The baseband signal is digitized using an analogue to digital converter 140.

Digital TV signals are received at the building by a receiver. In the present embodiment, these signals are received over the air, for example from a satellite television network, and placed onto the digital television cabling. In further embodiments, the television signals may be placed onto the cabling directly from an internal source. For example, a hotel may run movie channels from an internal source. In further embodiments, different types of data may be carried on certain channels of the cable or a combination of data types may be carried along the cable.

The system also includes a means for determining the full data carrying bandwidth of the cabling system. Cable infrastructures often include components, for example amplifiers, which have a limited bandwidth compared with the bandwidth of the cable. Therefore, the usable bandwidth of the cable is limited by these components since such components will filter out any signals having a frequency outside their bandwidth. For example, cables used to carry digital television signals typically have a bandwidth of 0-2400 MHz. However, often, such cables include amplifiers which only allow signals to pass if they have frequency between 40-900 MHz, traveling in the downlink direction (i.e. from the satellite system down into the building). Therefore, any downlink signal to be passed along the cable must be in the frequency range of 40-900 MHz. Signals outside this frequency range will be filtered by the amplifiers. In this embodiment, the downlink RF signal must be put on a channel within the frequency range 40-900 MHz since signals outside these limits will be filtered by the amplifiers. This allowed frequency range which can be carried, unfiltered, by the cabling system is known as the passband. For any system, the passbands in the uplink and downlink directions may be different.

The passband may be known and maintained for a particular cable infrastructure, however, to account for situations in which the cable infrastructure is updated during its lifetime, preferred embodiments include a facility for measuring the passband of the cable infrastructure and the passband may be measured at periodic time intervals.

The digital signal is then spread over a frequency range by a spreader 150. The frequency range over which the signal is spread is determined in dependence on the specific data carrying cable infrastructure of the cables through which the digitized RF signal is to be carried. In this case the RF signal may be digitized and spread within the passband range since any components of the signal outside these limits may be filtered by the amplifiers. Thus, in the current example, the downlink RF signal is digitized and spread within the frequency range of 40-900 MHz. Preferred embodiments of the invention include a means for determining the passband of the specific cable system.

The signal can be spread using any suitable spreading technique, for example direct sequence spread spectrum.

In preferred embodiments the signal is spread across the full passband. For example if the cable infrastructure allows a passband of 40-900 MHz, the RF signal should be spread across the full 40-900 MHz range. The larger the range over which the signal is spread, the smaller the magnitude of the spread signal. It is preferable for the magnitude of the RF signal to be kept as low as possible in order that interference with other signals on the cable is kept as low as low as possible. Thus, for a given system, preferred embodiments spread the signal across the complete passband.

Once the signal has been spread it is input into the cable 160. The signal can be input into any cable suitable for carrying digital signals. Typically, optical cables are used for carrying digital television data but the invention could be applied to co-axial cables or any other cable suitable for carrying digital data.

The spread signal can be extracted from the cable at any location where RF signal coverage is required 170. The signal is despread by a despreader 180. The signal is then converted back into an analogue signal using a digital to analogue converter 190. The signal is then mixed back with the RF carrier frequency 200 and filtered 210 before being forwarded to a transmitter for transmission 220.

Figure 3:
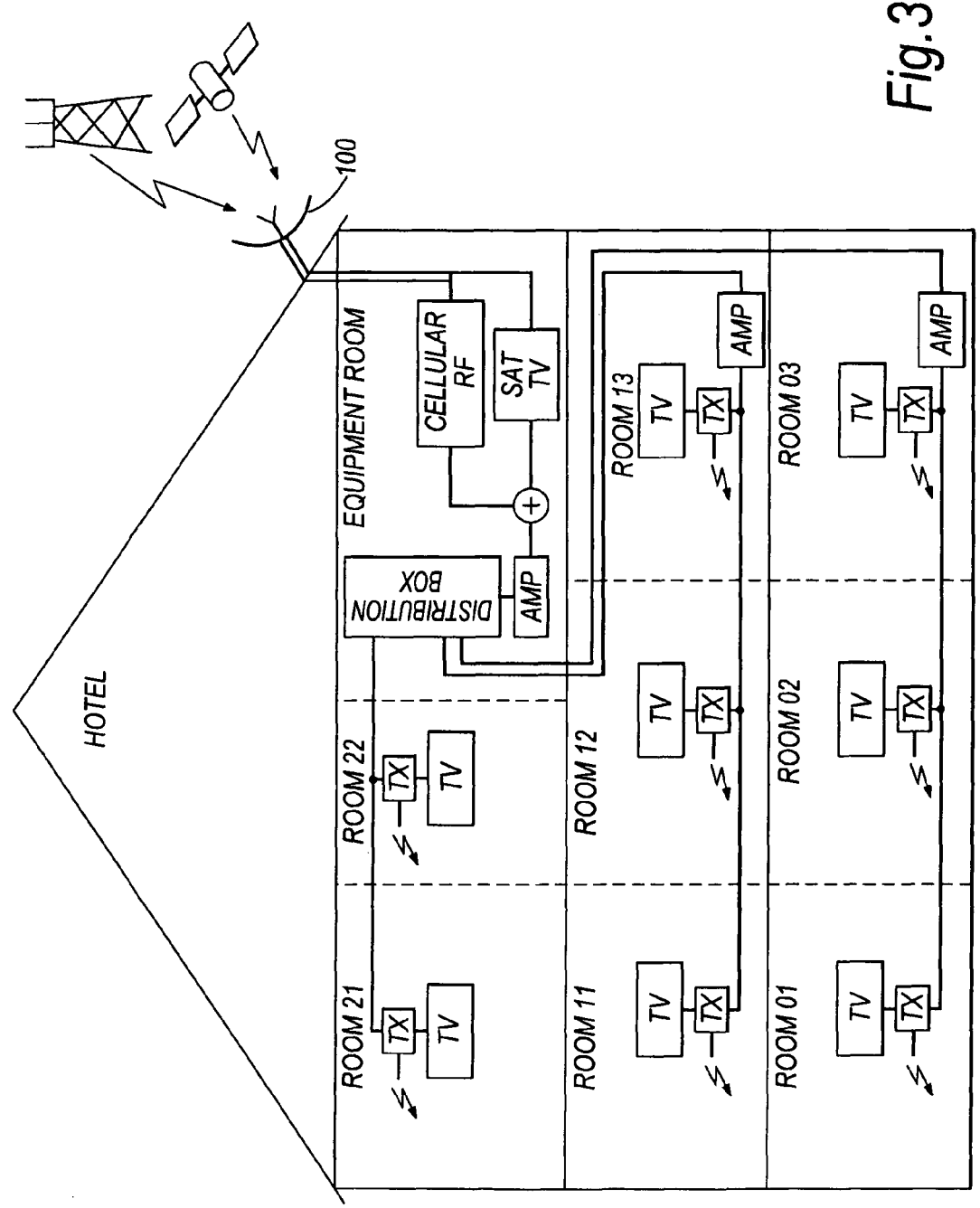
FIG. 3 shows an example of the installation of an embodiment of the invention within a building.

FIG. 3 shows a building (a hotel) which is in an area of RF coverage but in which areas within the building experience poor RF coverage. The example of FIG. 3 shows how RF signals can be distributed within the digital television cabling within a building in order to improve the RF coverage within the building. Digital television cabling is particularly useful for distributing RF in this case since it is often laid throughout a building and directed into many different rooms or areas of the building, for example in a hotel or office. This distributed cabling provides the potential for transmitters to be put in many different locations throughout the building in order to produce widespread coverage. In the example of a hotel which has many rooms, the digital television cabling within the hotel is split at several points in order that each room is provided with digital television coverage. In such cases, it would be possible to have separate RF signal extractors, despreaders, digital to analogue converters and transmitters in several of the rooms in order to provide RF coverage in those rooms and, therefore, throughout the hotel. Thus, each room has an RF transmitter (TX). In many situations, acceptable coverage can be provided throughout the building without requiring a transmitter in every room.

Systems incorporating the system described herein can provide improved network coverage, however, a mobile device is only able to communicate with a network if it is able to both receive signals from the network and transmit signals back to the network. Typically, an area of poor network coverage is also an area in which a device cannot successfully transmit signals to reach a base station. Preferred systems incorporating the system described herein also enable signals from devices which are positioned in areas of naturally poor coverage to reach base stations. Preferred embodiments incorporate a dual transmitter/receiver device which replicated the downlink (DL) system components in reverse for the uplink (UL) path (i.e. from a mobile communication device to the macro network). The receivers receive signals transmitted from the mobile devices. These signals are digitized, spread across the available bandwidth and input into the cabling in the same way as the signals from the base stations. The signals are then carried to an area of good RF coverage where they are extracted, despread, converted to analogue and transmitted back to the base station. Such receivers may be co-located with the transmitters or may be located, and provide entry to the cable, at a separate point.

Any system which carries both uplink and downlink signals requires a bidirectional signal carrying capability. Typically, particular types of cabling, for example cabling installed for digital television use is designed to carry data which is predominantly unidirectional, since the majority of traffic in a digital television system will be in the downlink direction. While the cable itself is capable of carrying signals in either direction, the components placed along the cable may prevent the flow of data in one direction. For example, some amplifiers may only allow downlink traffic or allow uplink traffic within a limited frequency range. Therefore, the passband may be different between the uplink and downlink directions on a single cable. Therefore, in preferred embodiments of the invention the passband in the uplink direction will be measured and the spreaders at the mobile signal receive end will spread the uplink signal within the uplink passband. Again, preferred embodiments spread the signal across the full passband in order to keep the magnitude of the signal as low as possible.

Therefore, in preferred embodiments of the invention, whenever the passband of the cabling is measured, the measurement is made in the direction of the RF signal (i.e. uplink or downlink) and the RF signal is then spread within the corresponding passband in that direction.

Figure 4:
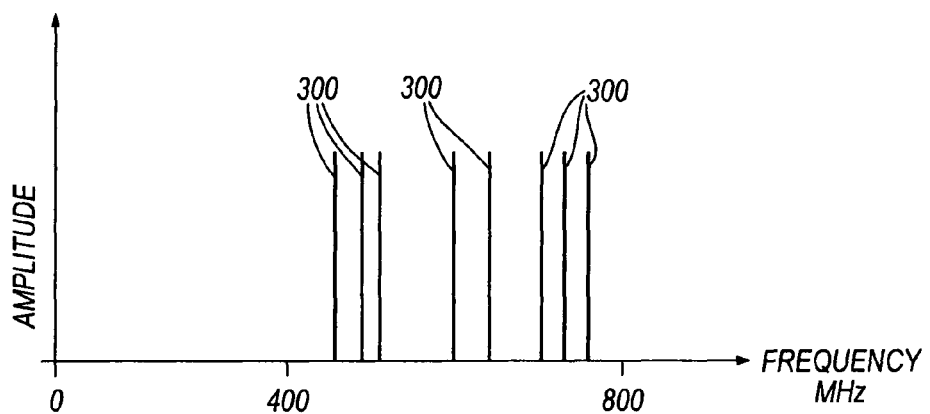
FIG. 4 shows the signals carried by a cable in an embodiment of the invention.

FIG. 4 shows an example of the signals carried in a typical digital television cable. Typically, the bandwidth of fibre optic cables used in digital television systems can carry signals between 0-2000 MHz. In practice, television channels 300 are provided at frequencies between around 400-800 MHz. Typical amplifiers used at different points along the cable are able to amplify downlink signals between 40-900 MHz. Therefore, any signals outside that frequency range are filtered by the amplifier. In such an embodiment, a downlink RF signal should be spread within the passband of the system, i.e. 40-900 MHz, before being input into the cable and mixed with the digital television signals. By spreading the RF signal across the entire passband the magnitude of the RF signal is reduced as much as possible without risking the loss of RF data due to filtering by the amplifiers. It is advantageous to make the magnitude of the signal as low as possible since lower magnitudes will cause less interference to other data on the cable, e.g. digital television signals.

In the uplink direction, the passband may be between 5-40 MHz. Therefore any uplink RF signals received from mobile communications devices are spread between 5-40 MHz and inserted into the cable for distribution, extraction and transmission back to the core network.

One consideration when spreading the RF signal is the noise level within the cable. Only a low power spread RF signal is needed as the dispreading gain serves to extract the signal from the thermal noise and the narrow band TV channel interference.

Figure 5:
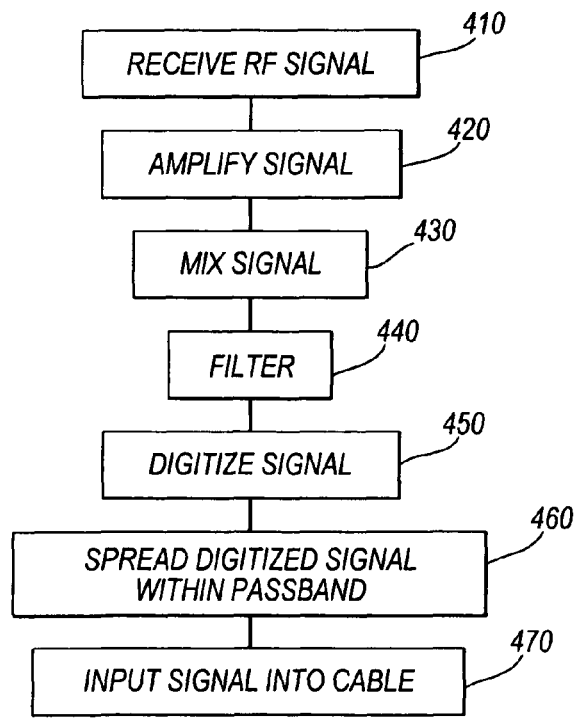
FIG. 5 is a flow diagram showing the steps taken to input an RF signal into an existing cable system and utilizing the entire passband.

FIG. 5 is a flow diagram showing the steps taken when an RF signal is received and input into a cable. At 410 the RF signal is received. The signal is amplified, mixed, filtered and digitized at 420, 430, 440 and 450 respectively. The RF signal is then spread within the relevant (i.e. uplink or downlink) passband of the installed system at 460 and input into the cable at 470.

Figure 6:
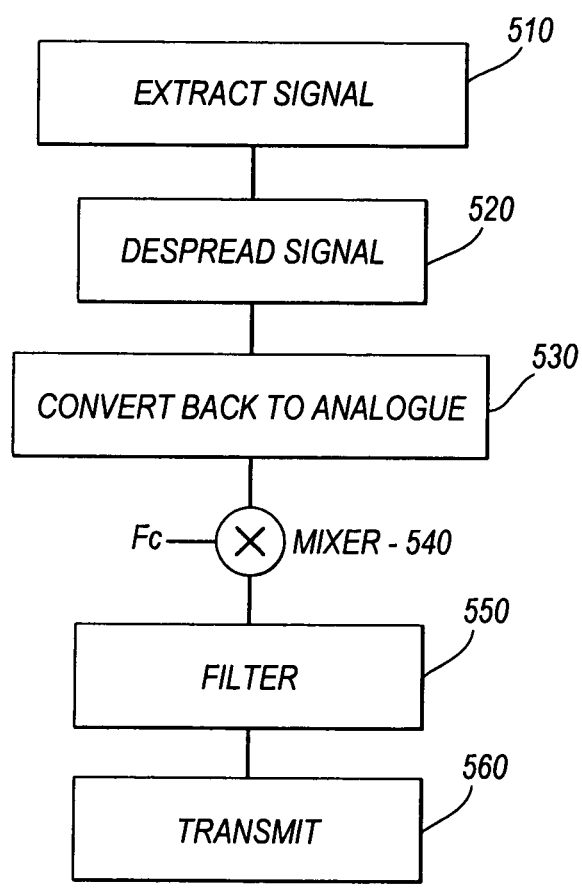
FIG. 6 is a flow diagram showing the steps taken to extract an RF signal from a cable in an embodiment of the invention.

FIG. 6 is a flow diagram showing the steps taken the spread signal is extracted from the cable in an embodiment of the invention. At 510 the spread signal is extracted from the cable. The signal is then despread and converted to analogue. The despread signal is mixed onto the transmission frequency at step 540 before being filtered at 550 and transmitted at 560.

Preferred embodiments of the invention provide a method and apparatus for RF distribution which can be implemented into pre-installed cabling in order to provide improved coverage in geographical areas. It can be implemented on a large industrial scale to provide geographical areas with improved RF coverage or on a smaller and domestic scale to improve RF coverage within buildings. Preferably, the system can be implemented by providing a pair of units which include a transmitter and receiver, spreader and despreader and digital-to-analogue and analogue-to-digital converters which can be attached to existing cabling in an area of good RF reception and in an area of poor RF reception.

In preferred embodiments of the invention, the system for receiving and transmitting RF and inputting and extracting the signal from the cable is incorporated into an existing piece of hardware, for example a set top box. Thus a customer can use a device which is commonly used to provide improved RF coverage.

The specific example described above uses the digital television cabling within a building to improve RF coverage. However, any cable suitable for carrying data can be used. High capacity cables such as fibre optic or co-axial are obvious choices due to their data carrying capacity but any other type of cable can be used, for example telephone, copper, cables if the system has lower capacity requirements.

The specific embodiments described above relate to the distribution of RF mobile phone signals. However, embodiments of the invention are not limited to the distribution of mobile phone signals but can be used to distribute any type of signal.

Additionally, embodiments of the invention can be used to distribute RF or other signals in a purely internal environment which is linked by a cable infrastructure. For example, in an office building the invention could be used use to direct internal calls around the building. Such an internal system would not need to receive or transmit the internal calls externally from the building or other internal environment. Thus the network for internal calls would not need to access the external telecommunications network.

Embodiments of the invention provide a solution to improving RF coverage which does not require complicated installation or extraction of existing cabling at multiple points. Such embodiments provide a cheap and easy to install system to improve RF coverage.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for distributing a radio frequency (RF) signal using a data cable system, comprising:
   receiving the RF signal, wherein the received RF signal is a wireless signal transmitted within a frequency range;
   determining a passband of the data cable system, wherein the passband of the data cable system is independent of the frequency range of the RF signal, and wherein the passband is a smaller range than a total bandwidth of the data cable system;
   processing the received RF signal as a processed RF signal;
   spreading the processed RF signal within the passband as a spread signal, wherein the spread signal is spread across a full range of the passband determined for the data cable system;
   inserting the spread signal into the data cable system;
   extracting the spread signal from the data cable system as an extracted signal;
   converting the extracted signal to a transmission frequency as a converted signal; and,
   transmitting the converted signal.

2. The method for distributing the RF signal according to claim 1, wherein the RF signal is a telecommunications signal.

3. The method for distributing the RF signal according to claim 1, wherein the data cable system includes a television coaxial cable.

4. The method for distributing the RF signal according to claim 1, further comprising:
   determining whether the RF signal that is received is in an uplink or downlink direction, and wherein determining the passband of the data cable system determines the passband in the direction of the RF signal that is received, and wherein the spread signal is spread across the full range of the passband that has been determined for the data cable system and according to the determined uplink or downlink direction of the RF signal.

5. The method according to claim 4, wherein the passband determined in the uplink direction for the data cable system is different from the passband determined in the downlink direction for the data cable system.

6. An apparatus for distributing a radio frequency (RF) signal using a data cable system, comprising:
   a receiver that receives the RF signal, wherein the received RF signal is a wireless signal transmitted within a frequency range;
   a passband determining unit that determines the passband of the data cable system, wherein the passband of the data cable system is independent of the frequency range of the RF signal, and wherein the passband is a smaller range than a total bandwidth of the data cable system;
   a processor that processes the received RF signal as a processed RF signal;
   a spreader that spreads the processed RF signal within the passband as a spread signal, wherein the spread signal is spread across a full range of the passband determined for the data cable system;
   an inserter that inserts the spread signal into the data cable system;
   an extractor that extracts the spread signal from the data cable system;
   a converter that converts the extracted signal to a transmission frequency as a converted signal; and,
   a transmitter that transmits the converted signal.

7. The apparatus for distributing the RF signal according to claim 6, wherein the RF signal is a telecommunications signal.

8. The apparatus for distributing the RF signal according to claim 6, wherein the data cable system includes a television coaxial cable.

9. The apparatus for distributing the RF signal according to claim 6, further comprising:
   a direction determining unit that determines whether the RF signal that is received is in an uplink or downlink direction, and wherein the passband determining unit determines the passband in the direction of the RF signal that is received, and wherein the spread signal is spread across the full range of the passband that has been determined for the data cable system and according to the determined uplink or downlink direction of the RF signal.

10. The apparatus according to claim 9, wherein the passband determined in the uplink direction for the data cable system is different from the passband determined in the downlink direction for the data cable system.

11. An apparatus for distributing a radio frequency (RF) signal using a data cable system, comprising:
    a set-top-box that includes:
       a receiver that receives the RF signal, wherein the received RF signal is a wireless signal transmitted within a frequency range;
       a passband determining unit that determines the passband of the data cable system wherein the passband of the data cable system is independent of the frequency range of the RF signal, and wherein the passband is a smaller range than a total bandwidth of the data cable system;
       a processor that processes the received RF signal as a processed RF signal;
       a spreader that spreads the processed RF signal within the passband as a spread signal, wherein the spread signal is spread across a full range of the passband determined for the data cable system;
       an inserter that inserts the spread signal into the data cable system;
       an extractor that extracts the spread signal from the data cable system;
       a converter that converts the extracted signal to a transmission frequency as a converted signal; and
       a transmitter that transmits the converted signal.

12. The apparatus for distributing the RF signal according to claim 11, wherein the RF signal is a telecommunications signal.

13. The apparatus for distributing the RF signal according to claim 11, wherein the data cable system includes a television coaxial cable.

14. The apparatus for distributing the RF signal according to claim 11, further comprising:
    a direction determining unit that determines whether the RF signal that is received is in an uplink or downlink direction, and wherein the passband determining unit determines the passband in the direction of the RF signal that is received, and wherein the spread signal is spread across the full range of the passband that has been determined for the data cable system and according to the determined uplink or downlink direction of the RF signal.

15. The apparatus according to claim 14, wherein the passband determined in the uplink direction for the data cable system is different from the passband determined in the downlink direction for the data cable system.

* * * * *